United States Patent
Nethi et al.

(10) Patent No.: US 10,231,120 B2
(45) Date of Patent: Mar. 12, 2019

(54) OFFLOADED SECURITY AS A SERVICE

(71) Applicant: Cisco Technology, Inc., San Jose, CA (US)

(72) Inventors: Ramesh Nethi, Bangalore (IN); Tirumaleswar Reddy, Bangalore (IN); Srinivas Chivukula, Bangalore (IN); Prashanth Patil, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 620 days.

(21) Appl. No.: 13/652,825

(22) Filed: Oct. 16, 2012

(65) Prior Publication Data

US 2014/0105103 A1 Apr. 17, 2014

(51) Int. Cl.
| | |
|---|---|
| *H04W 28/08* | (2009.01) |
| *H04W 12/02* | (2009.01) |
| *H04W 4/06* | (2009.01) |
| *H04L 29/06* | (2006.01) |

(52) U.S. Cl.
CPC ........ *H04W 12/02* (2013.01); *H04L 63/1408* (2013.01); *H04W 4/06* (2013.01)

(58) Field of Classification Search
CPC .................................................... H04W 12/02
USPC ................................................ 370/328, 338
See application file for complete search history.

(56) References Cited

U.S. PATENT DOCUMENTS

| | | | |
|---|---|---|---|
| 7,316,029 B1 | 1/2008 | Parker et al. | |
| 7,593,377 B2 | 9/2009 | Thubert et al. | |
| 7,953,087 B1 * | 5/2011 | Bollay | H04L 45/02 370/392 |
| 8,144,684 B2 | 3/2012 | Harper et al. | |
| 8,724,591 B2 | 5/2014 | Jin et al. | |
| 2005/0210532 A1 * | 9/2005 | Winick | H04L 63/20 726/22 |
| 2006/0193474 A1 * | 8/2006 | Fransdonk | H04L 9/0825 380/279 |

(Continued)

FOREIGN PATENT DOCUMENTS

| | | | |
|---|---|---|---|
| CN | 102118789 A | 7/2011 | |
| WO | 2011-079634 A1 | 7/2011 | |
| WO | WO 2012099541 A1 * | 7/2012 | ......... H04L 12/2856 |

OTHER PUBLICATIONS

Carlos J. Bernardos et al., "Network-based Localized IP Mobility Management: Proxy Mobile IPv6 and Current Trends in Standardization", Journal of Wireless Mobile Networks, Ubiquitous Computing, and Dependable Applications, vol. 1, No. 2/3, pp. 16-35, accessed Jul. 2011.

(Continued)

*Primary Examiner* — Robert M Morlan
*Assistant Examiner* — Pamit Kaur

(57) ABSTRACT

In one implementation, traffic in a mobile network is offloaded to a security as a service server or a cloud server. A mobile access gateway (MAG) in the mobile network identifies one or more mobile nodes that are configured for communication on the mobile network. The MAG receives a message that includes an address of a mobile node and sends a request based on the message to the security as a service server. The MAG forwards traffic flows to the security as a service server according to the message, which is configured to detect an indication of malicious software in the traffic flows and/or filter content of the traffic flows according to a user profile.

20 Claims, 5 Drawing Sheets

(56) References Cited

U.S. PATENT DOCUMENTS

| | | | |
|---|---|---|---|
| 2008/0175382 A1* | 7/2008 | Gearhart | H04L 63/0209 380/255 |
| 2008/0220740 A1* | 9/2008 | Shatzkamer et al. | 455/411 |
| 2009/0172782 A1* | 7/2009 | Taglienti | G06Q 30/06 726/4 |
| 2009/0257416 A1* | 10/2009 | Walker et al. | 370/338 |
| 2011/0264906 A1* | 10/2011 | Pourzandi | G06F 21/6218 713/153 |
| 2012/0054809 A1 | 3/2012 | Chowdhury et al. | |
| 2012/0063300 A1* | 3/2012 | Sahin et al. | 370/225 |
| 2012/0166618 A1 | 6/2012 | Dahod et al. | |
| 2012/0185597 A1* | 7/2012 | Luna | 709/225 |
| 2012/0269134 A1* | 10/2012 | Jin et al. | 370/328 |
| 2013/0029708 A1* | 1/2013 | Fox et al. | 455/509 |
| 2013/0243075 A1* | 9/2013 | Dalela | H04L 65/80 375/240.01 |
| 2013/0252583 A1* | 9/2013 | Brown | H04W 12/06 455/411 |
| 2014/0153489 A1* | 6/2014 | Perras | H04W 60/00 370/328 |
| 2014/0213278 A1 | 7/2014 | Jin et al. | |
| 2015/0237027 A1* | 8/2015 | Kim | H04L 63/08 726/3 |

OTHER PUBLICATIONS

S. Gundavelli et al., "IPv4 Traffic Offload Selector Option for Proxy Mobile IPv6", Netext WG, Feb. 9, 2012.

J. Korhonen et al., "Diameter Proxy Mobile IPv6: Mobile Access Gateway and Local Mobility Anchor Interaction with Diameter Server", Internet Engineering Task Force (IETF), RFC 5779, Feb. 2010.

B. Aboba et al. "The Network Access Identifier", Network Working Group, RFC 4282, Dec. 2005.

European Search Report for European Patent Application No. 13897259.1, dated Aug. 18, 2016.

International Search Report and Written Opinion, from PCT/US2013/046729, dated Jul. 15, 2015, WO.

English translation of First Office Action and Search Report in corresponding Chinese Application No. 2013800537960, dated Jan. 25, 2018, 6 pgs.

European Patent Office Communication issued in counterpart European Application No. 13897259.1, dated Dec. 4, 2017, 4 pgs.

International Preliminary Report on Patentability, from PCT/US2013/046729, dated Aug. 13, 2015, WO.

* cited by examiner

OFFLOADED SECURITY AS A SERVICE

TECHNICAL FIELD

This disclosure relates in general to the field of mobile data traffic, more particularly, to offloaded mobile data traffic for security applications.

BACKGROUND

Mobile data traffic refers to data traffic over mobile networks (e.g., cellular networks). The rise of the smartphone has caused mobile data traffic worldwide has double every year for approximately five years. Current mobile data traffic is eight times the entire global internet in the year 2000. The amount of mobile data traffic is expected to continue to increase at exponential rates in the future. By 2016, mobile data traffic is projected to increase eighteen fold. The number of mobile connected devices is projected to surpass the world's population.

Mobile network operators continue to explore new strategies to accommodate the exponential growth of mobile data traffic. Some strategies involve offloading IP flows at the nearest access edge of the mobile network. Data offloading takes advantage of parallel or complementary network technologies for delivering data originally targeted for cellular networks. This approach results in efficient usage of the mobile packet core and lowers transport cost. The end users enjoy higher bandwidth and lower service costs. However, some IP flows cannot be offloaded to complementary networks using conventional technologies.

BRIEF DESCRIPTION OF THE DRAWINGS

Exemplary embodiments of the present embodiments are described herein with reference to the following drawings.

DESCRIPTION OF EXAMPLE EMBODIMENTS

Overview

Figure 1:
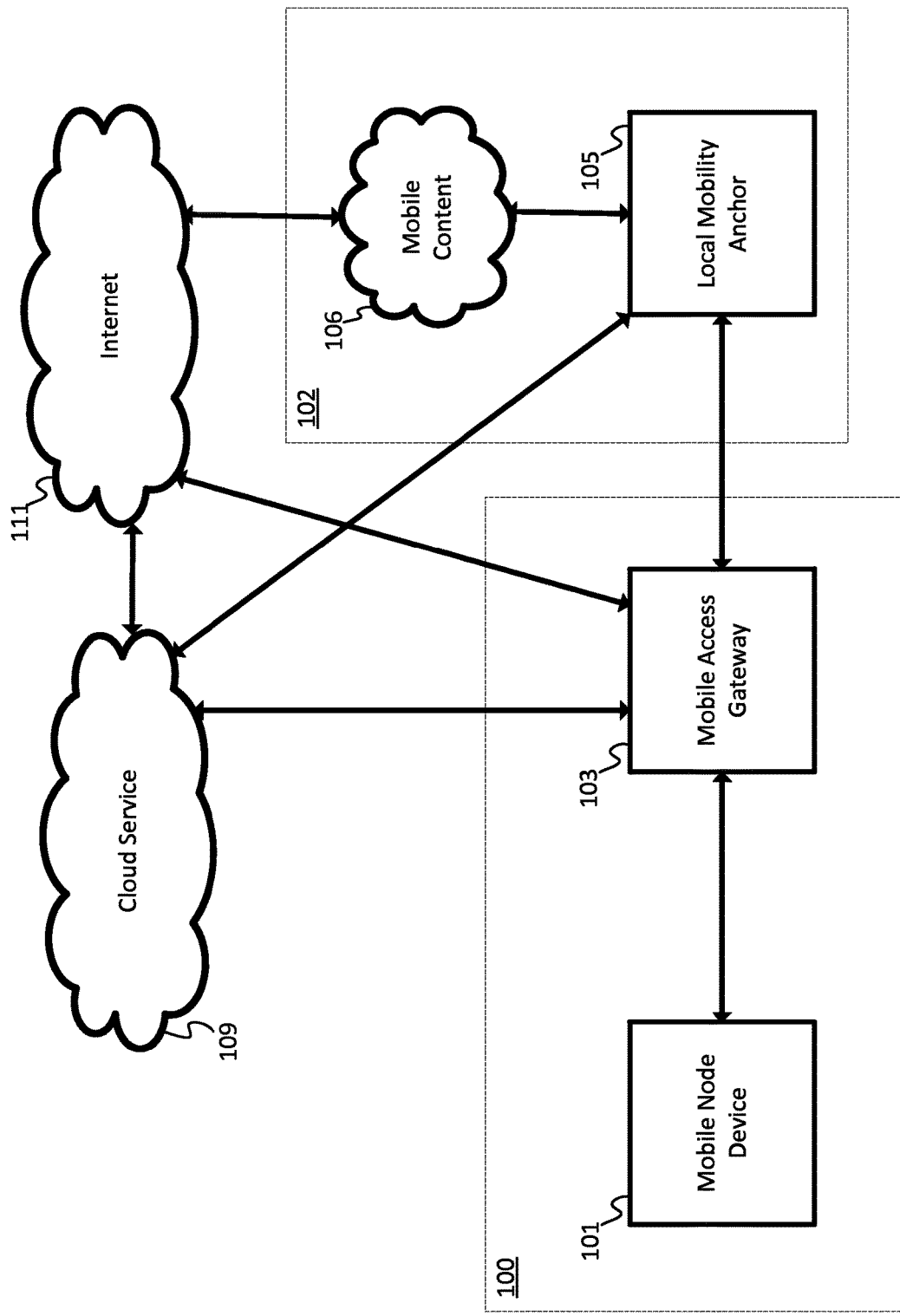
FIG. 1 illustrates an example network for offloading security as a service.

In one embodiment, a method includes identifying a mobile node configured for communication on a cellular network, receiving a message for offloading traffic flows, wherein the message includes an address of a mobile node, sending a request based on the message to a security as a service server, and forwarding traffic flows to the security as a service server according to the message.

In another embodiment, an apparatus includes at least a communication interface and a controller. The communication interface configured to receive a message for offloading traffic flows of a mobile node on a mobile network, and the message includes an address of the mobile node. The controller configured to generate a request, based on the message, for a security as a service server and route traffic flows to the security as a service server according to the message.

In another embodiment, a computer readable medium containing instructions to identify a mobile node for communication on a mobile network, receive a message for offloading traffic flows, wherein the message includes an address of the mobile node, generate a request to offload traffic flows to a security as a service server, and forward the traffic flows to the security as a service server such that the security a service server is configured to modify the traffic flows.

Example Embodiments

Proxy mobile IPv6 provides mobility management to at least one mobile node (MN). In spite of the "IPv6" descriptor, the mobile node may be a single stack node, such as an IPv4 only node or an IPv6 only node, or the mobile node may be a dual stack node, such as a node with both IPv4 and IPv6 capabilities. The MN avoids IP mobility signaling. Instead, a mobile access gateway (MAG) is configured to perform mobility signaling on behalf of the MNs associated with the MAG. The MAG is a network device, which may be a router. In other implementations, the MAG may be a gateway, a hub, a switch, or another network device. The MAG may be the access router (first hop router) for the MNs. That is, the MAG provides connectivity to the internet for the MNs as the first hop router.

A local mobility anchor (LMA) is the home agent for the MN in proxy mobile IPv6. The LMA stores all of the routing information needed to reach each of the MNs. The mobile node is assigned an address from the home network. The mobile node is associated with a care-of address, which provides information about the mobile node's current location. The care-of address is provided by the MAG on behalf of the mobile node, as described in request for comments (RFC) 5213, as published in 2008. IPv6 packets addressed to the home address of the mobile node may be routed to its care-of address by the LMA. The LMA is a router on a mobile node's home link with which the mobile node has registered its current care-of address. While the mobile node is not connected to the home network, the home agent intercepts packets on the home link addressed to the home address, encapsulates the packets, and tunnels them to mobile node's registered care-of address.

In PMIPv6 for IPv6, the mobile node may be assigned prefixes from both the home network and the local access network. If the mobile node uses the prefix provided by local access network to reach some destination in the Internet (e.g. web server), such traffic based on the security policy negotiated between the MAG and LMA is subjected to inspection and hence is forwarded by the MAG to cloud service. The MAG in this scenario acts as cloud connector.

FIG. 1 illustrates an example of a network for offloading security as a service. The network includes a local access network portion 100 and a home network portion 102, each of which is connected the internet 111. The local access network 100 includes at least one mobile node 101 and a mobile access gateway (MAG) 103. The mobile access gateway 103 may connect to the internet 111 directly or through a cloud service 109. The local access network 100 may also include a network address translation device and local services. The home network portion 102 includes a local mobility anchor 105, which is configured to access mobile content 106 through cellular networks.

A specification for offloading traffic between a MAG and a LMA in a Proxy Mobile IPv6 domain is described in the working draft IPv4 Traffic Offload Selector Option for Proxy Mobile IPv6 published Feb. 9, 2012 and available at http:// tools.ietf.org/html/draft-ietf-netext-pmipv6-sipto-option-05. The offload traffic includes IP flows. An IP flow is a set of IP packets that include a common traffic selector based on source address, destination address, source port, destination port, or another indicator. The offloaded traffic is routed directly to local access network portion 100 instead of the home network portion 102.

The MAG 103 is configured to offload traffic by using the traffic selectors to identify the traffic that can be offloaded. In one example, hypertext transfer protocols (HTTP) are offloaded by the MAG 103 and other flows are tunneled to the LMA 105 and home network portion 102. The offloaded traffic may be routed to the internet 111 using a wireless local access network (WLAN) or another access network.

The offloaded traffic helps optimize the speed of the MN and the user experience for the operator of the MN. However, offloaded traffic is not subjected to the network security services provided by the home network portion 102. These network security services include malicious software checks. The malicious software may include viruses, malware, and other security threats.

The MAG 103 is configured to redirect traffic to a cloud based security device, which provides cloud service 109. The MAG 103 may execute a cloud connector to connect a particular IP flow to the cloud based security device. The cloud connector is a set of instructions stored in MAG 103 and executed by MAG 103, or hosted by MAG 103, and integrated with the routing instructions of MAG 103 in order to provide cloud service 109. The cloud connector generates an identification message associated with the IP flow. The identification message associated a MN with the IP flow. The identification message may specify a security policy for the IP flow. The security policy defines one or more security services to be performed on the IP flow.

In one example, the MAG 103 may query the LMA 105 for the security policy associated with a particular MN 101. The LMA 105 includes a security database stored in memory that associates multiple MNs with respective security policies. The security policies vary according to service level agreements (SLAs), such as high level SLAs or policies and low level SLAs or policies. High level policies may be based on the age of the user for adult content filtering or parental control. High level policies may block download of software of the download of malware or malicious content. Low level policies may be configured to block traffic from any external source or block traffic from sources that no previous outgoing packets from the mobile node have listed. Low level policies may restrict opening of transmission control protocol (TCP) connections can be opened only from the home network.

The LMA 105 provides the appropriate security policy to the MAG 103. The MAG 103 selects a cloud service 109 based on the security policy or includes data indicative of the security policy in the identification message for the IP flow.

The cloud service 109 is an example of software as a service (SaaS). The cloud service may be Cisco ScanSafe Cloud Web Security provided by Cisco Systems, Inc. of San Jose, Calif. The cloud service 109 provides security services. Security services include malicious software blocking, content filtering, and statistics gathering. Security services provide malicious software blocking as protection against viruses, spyware, and other malware that targets the mobile nodes. Security services provide content filtering to limit the types of content received at the mobile node. The content filtering may be based on parental controls, or specifically tailored filtering for mobile hotspots or public networks. The content filtering may be based on a user profile. Security services provide statistics gathering by counting data flows. For example, a number of packets or a quantity of data in a flow may be counted and reported to a service provider. Alternatively or in addition, the cloud service 109 may provide spam filtering. The cloud service 109 may include an email filter. The email filter may include criteria such as keywords, address munging, and a list of known spammers.

The LMA 105 offloads the traffic to the MAG 103. The MAG 103 routes traffic to the cloud service 109 in route to the internet 111 and traffic from the internet 111 returns through the cloud service 109.

Figure 2:
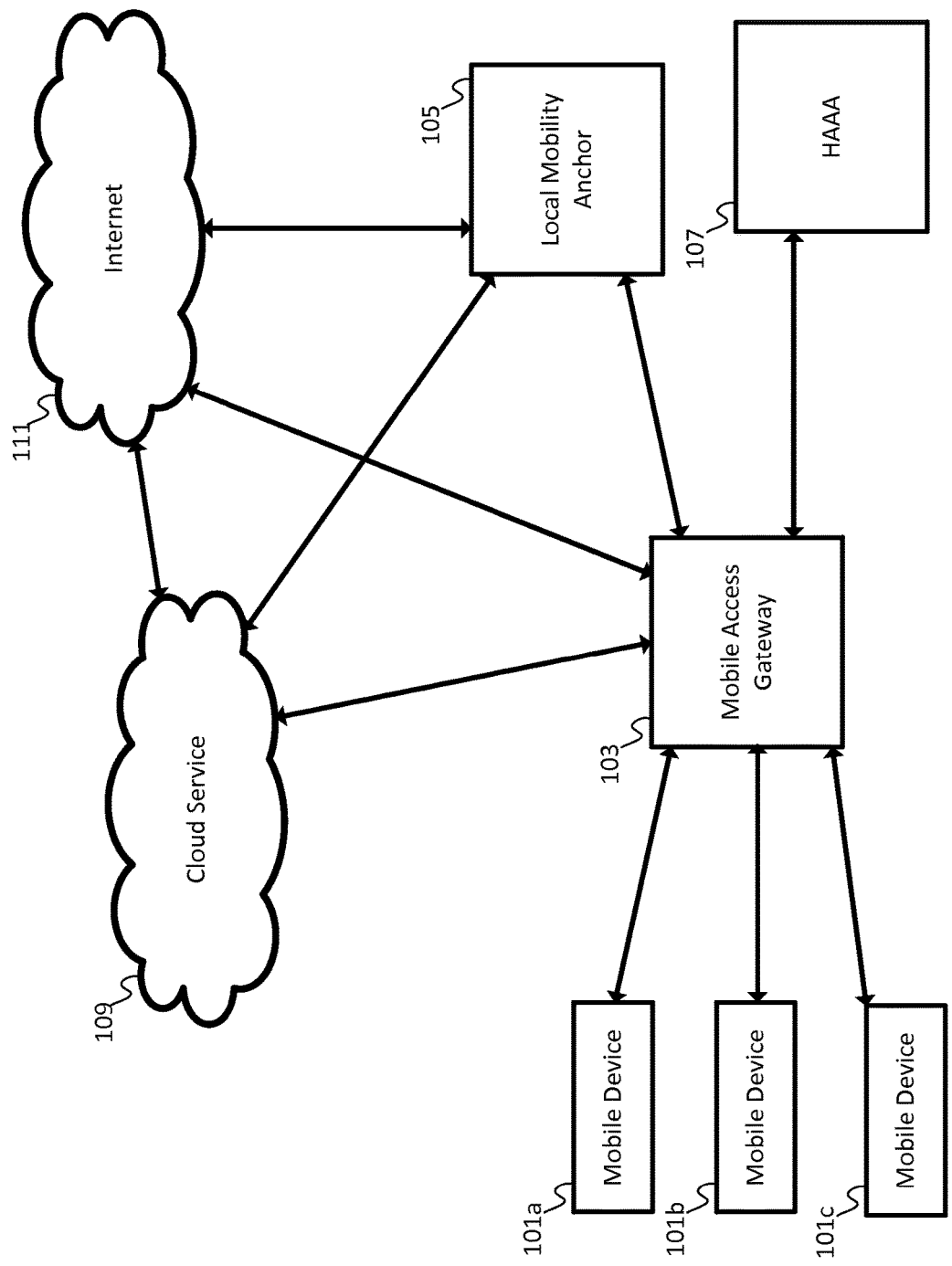
FIG. 2 illustrates another example of a network for offloading security as a service.

FIG. 2 illustrates another example of a network for offloading security as a service. FIG. 2 includes a plurality of mobile devices 101a-c connected to a MAG 103. The mobile devices 101a-c may be cellular devices (e.g., 3G, 4G, 4G-LTE, or later developed mobile standards), wireless fidelity devices (e.g., IEEE 802.11 family of standards), or another type of device. The mobile devices 101a-c may be configured with access technologies such as WiMAX, 3rd Generation Partnership Project (3GPP) standards, 3GPP2 and WLAN based access architectures.

The MAG 103 is coupled with an LMA 105 and a home authentication, authorization, and accounting (HAAA) server 107. The LMA 105 manages routing information for mobile devices 101a-c. Each mobile node is assigned a care-of address, which provides information about the mobile node's current location. The HAAA server 105 is located in user's home network. The security architecture for distributed systems, which enables control over which users are allowed access to which services, and how much of the resources they have used. A HAAA server 107 may be configured to execute the remote authentication dial in user service (RADIUS) protocol or the diameter protocol.

The MAG 103 is configured to identify one of mobile devices 101a-c from an IP flow. The HAAA server 107 authorizes and/or authenticates the mobile node for local network access. The HAAA server 107 may also configured to provide a policy profile for the mobile node to the MAG 103. The local network authenticates the mobile node and sends data indicative of the authentication to the MAG 103.

In response to the authentication of the mobile node, the MAG 103 generates a proxy binding update (PBU). The PBU is a request message including data for establishing a binding between network prefixes for the home network interface and the care-of address for the mobile node. The MAG 103 sends the PBU to the LMA 105.

The LMA 105 authorizes the received PBU and responds with a proxy binding acknowledgement (PBA) as a reply message to the MAG 103. Authorization of the PBU may performed by querying the HAAA server 107 using an authentication, authorization, and accounting protocol (e.g., diameter, RADIUS). The LMA 105 also sets up the routing and tunneling for the mobility session on behalf of the mobile node.

The LMA 105 obtains an identification message including the policy profile for the mobile node. When diameter is used for the authentication, authorization, and accounting protocol, policy profile may be encoded as an attribute value pair (AVP) packet. The MAG 103 receives the identification message including the policy profile for offloading traffic flows. The identification message also includes the address of the mobile node.

The MAG 103 is configured to announce the cloud connector awareness and capabilities to the HAAA 107. The HAAA 107 responds with a predetermined cloud connector profile to the MAG 103. The MAG 103 is configured to sending a request based on the identification message to the cloud service 109. After connection is established with the cloud service 109, the MAG 103 forwards IP flows to the cloud service 109 according to the identification message.

Figure 3:
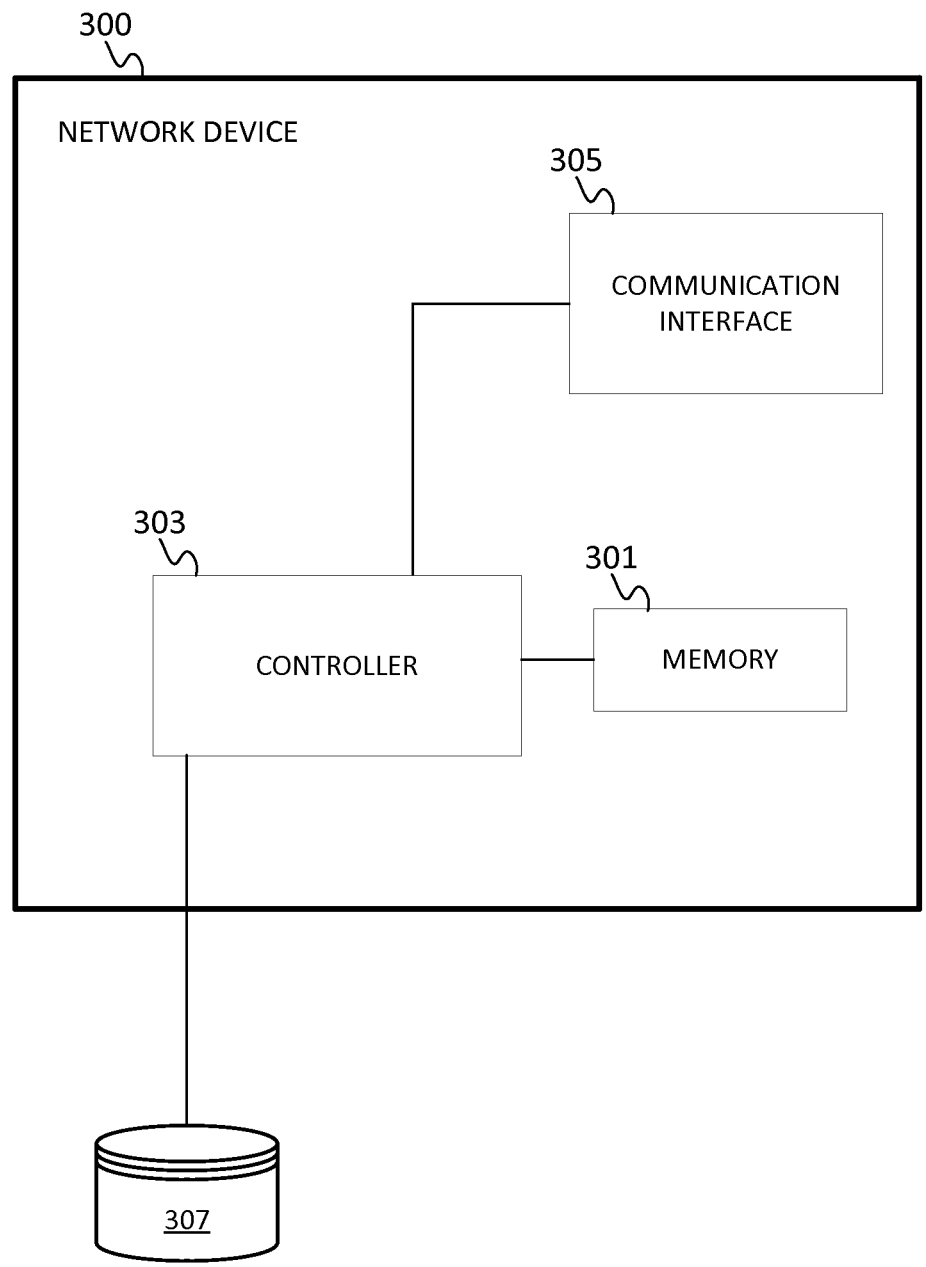
FIG. 3 illustrates an example network device for the networks of FIG. 1 of FIG. 2.

FIG. 3 illustrates an example network device 300 for the networks of FIG. 1 of FIG. 2. The network device 300 includes at least a memory 301, a controller 303, and a communication interface 305. In one example, a database 307 stores the policy profiles rather than the HAAA server 107 or the LMA 105. Additional, different, or fewer components may be provided. Different network devices may have the same or different arrangement of components The network device 300 may be a MAG or a LMA. The network device 300 may perform the embodiment above, in which the network device 300 generates a PBU, and the HAAA server 107 authorizes the PBU and responds with a policy profile for the mobile node. Alternatively, the network device 300 may be configured to employ a message oriented protocol for communication of data in distributed system. An example of such a protocol for middleware is extensible message and presence protocol (XMPP). XMPP may be referred to as a publish and subscribe system, real-time communication protocol or an instant messaging protocol. Other such protocols may be used (e.g., session initiation protocol for instant messaging and presence leveraging extensions (SIMPLE)).

A publish and control system is configured to define and create topics and publish information through an event notification broadcasted to all entities that have subscribed to a particular topic. The MAG 103 is configured to act as an XMPP client. For example, the MAG 103 subscribes itself to the LMA 105, which acts as an XMPP server. The MAG 103 is configured to query for a policy profile of a mobile node. The policy profile may be represented in an abstract model allowing XMPP clients to parse and apply the policies according to the capabilities of the MAG 103.

Figure 4:
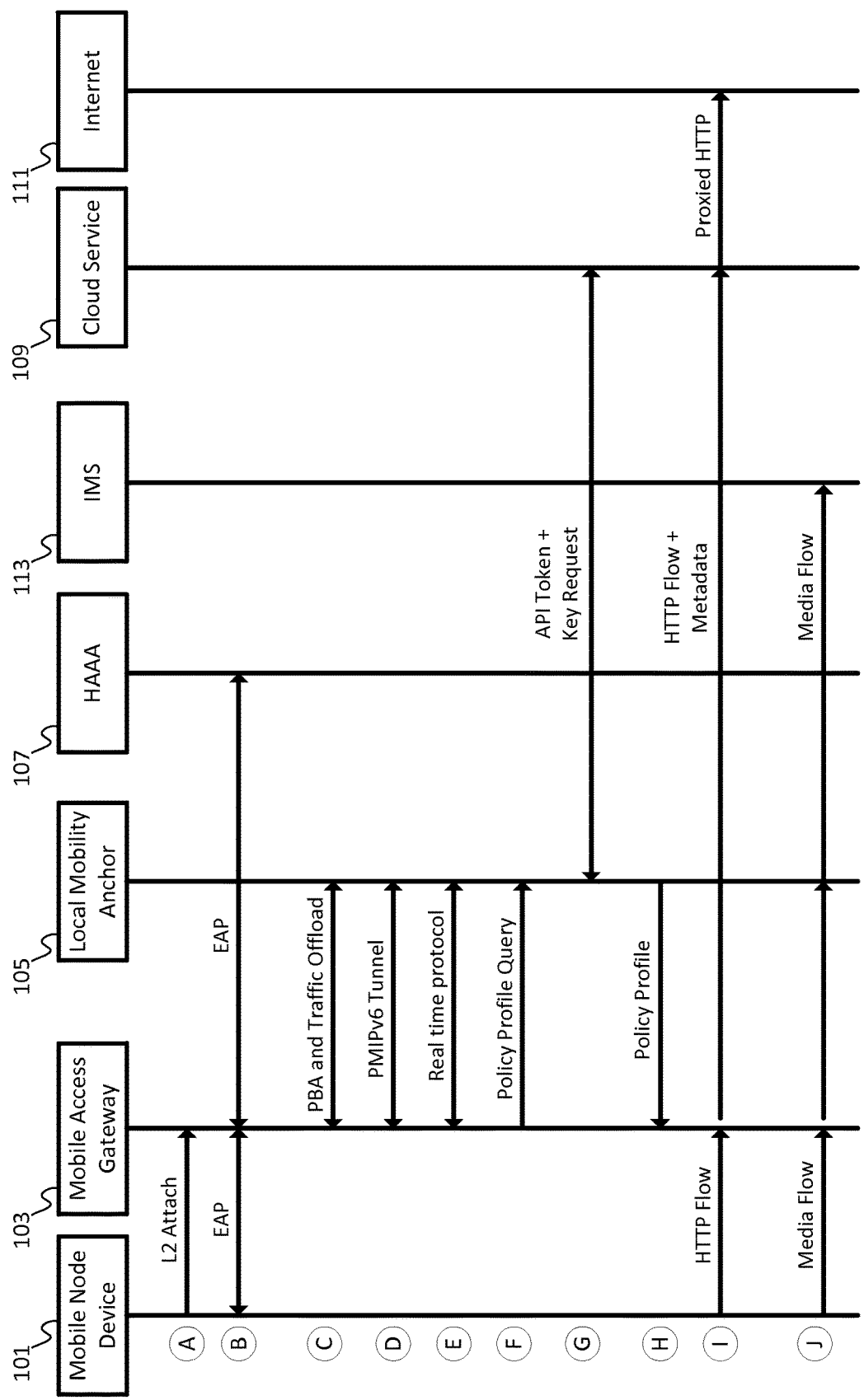
FIG. 4 illustrates an example time chart for offloading security as a service.

FIG. 4 illustrates an example time chart including a selectable combination of states A to J for offloading security as a service using this instant messaging embodiment. Any number of stages A to J may be included, and stages A to J may be performed in a different order or simultaneously or overlapping as permitted by the protocols involved.

The network device 300 may act as the MAG 103. Before offloading security as a service, the network device 300 first performs a traffic offload negotiation. The controller 303 is configured to perform a layer 2 attachment with the mobile node 101 at stage A, which includes identification of the mobile node 101. The controller 30 negotiates an extensible authentication protocol (EAP) authentication, as shown in stage B. Authentication with the HAAA server 107 may be omitted.

The signaling message exchange between the MAG 103 and the LMA 105 for negotiating the IP traffic offload is summarized by stages C and D. The MAG 103 generates a PBU and sends the PBU to the LMA 105, and the LMA 105 acknowledges the request. The PBU identifies the mobile node. The controller 303 sets up the PMIPv6 tunnel.

At stage E, the instant messaging protocol or real time protocol is utilized to establish additional communication between the MAG 103 and the LMA 105. In one example, the MAG 103 may act as a XMPP client and the LMA 105 may act as a XMPP server. The MAG 103 subscribes to the LMA 103 according to XMPP.

The controller 100 generates a query for a policy profile of a mobile node 101, as shown by stage F. The query is another example of an identification message for offloading traffic flows that includes data indicative of an identity of a mobile node and a profile police of the mobile node. The query may be in eXtensible Access Control Markup Language (XACML) format. XACML is a standardized, compact and abstract format that policy profiles may be represented and transported over instant messaging protocols and interpreted generically by cloud service devices. Other formats may be used (e.g., XML, ASCII). The MAG 103 is further configured to forwarding traffic flows to the cloud service device 109 according to the identification message. The cloud service is configured to decode the format of the policy profile. For example, the cloud service device 109 is configured to parse the policy profile and apply policies according to the capabilities of the MAG 103.

At stage G, the cloud service 109 may receive two pieces of data along with the offloaded traffic flow for policy enforcement. The first is a request including the identification message including identification of the mobile node 101. The identification message may be a network access identifier (NAI) as described in request for comments (RFC) 4282, published December 2005. The NAI is a stable identifier in the PMIPv6 domain that can predictably identify mobile node regardless of location. The second is the traffic redirector identification that identifies the MAG 103 as a traffic redirection device. The cloud service 109 is configured to identify the traffic redirection device from the IP address. The IP address may be included in a token. The token is a data packet that functions as a ticket granting the MAG 103 permission to use the cloud service 109.

The token may also include one or more of expiry time, an active/inactive flag, an optional name, or additional data. The expiry time defines a duration or a specific expiration time that the MAG 103 has permission to use the cloud service 109. The token may be cryptographically encrypted.

The traffic redirection device (e.g., MAG 103) redirects the traffic to the cloud service 109. The traffic redirection may be implemented using two alternative processes, shown at stage H, which allows for the flows. Stage J illustrates an HTTP flow and stage I illustrates a media flow (e.g., video, session initiation protocol (SIP) call).

In the first example of traffic redirection, traffic may be encapsulated by generic routing encapsulation (GRE) or another encapsulation technique. A GRE tunnel forwards traffic from the traffic redirection device to the cloud service 109. A forwarded data packet may include the GRE encapsulation, metadata, and the original packet from the mobile node. The metadata includes the identification value of the mobile node and the token. The metadata may be encrypted using a preshared key generated by the cloud service 109 and securely delivered to the MAG 103 using HAAA with the LMA 105 as an anchor. The preshared key may be exchanged by any combination of the mobile node, MAG 103, and the LMA 105 before traffic redistribution.

In a second example of traffic redirection, the traffic redirection device may add custom headers to the packets. The custom header may be an HTTP header. The metadata including the identification value of the mobile data and the token. The metadata may be embedded in the custom header. The metadata may be encrypted using a preshared key, which may be generated by the cloud service 109 and may be securely delivered to the MAG 103 using HAAA with the LMA 105 as an anchor. The traffic redirection device in this example acts as an intermediary between the mobile node and the cloud service using a separate connection with the cloud service server. The traffic redirection device modifies the source IP address and destination IP address in the request, adds the customer headers, and forwards the modified request to the cloud service 109.

The cloud service 109 is configured to offer at least one application programming interfaces (API). The API may use authentication and authorization mechanism (e.g., OAuth). The API includes instruction configured to create tokens, delete token, and list tokens. The token is a data packet that functions as a ticket granting the MAG 103 permission to use the cloud service 109. The cloud service 109 may provide the API securely over HTTPS.

This API, which may be a RESTful API, includes at least two REST resources. These resources use Java script object notation (JSON) as the data model language. The resources may include a Token resource and a TokenService resource. Further, the cloud service may organize and distinguish a list of REST URL resources in a list stored in memory. The list allows the cloud service 109 to support multiple tenants. The cloud service 109 is configured to identify REST URL resources based on a tenant identification value.

The LMA 105 is configured to send a POST request to the cloud service 109 to create a new token including a request body containing the IP address of the MAG 103 and expiry time of the token. After it receives the POST request, the cloud Service 109 is configured to create a new token and respond with a token resource URL. The LMA 105 is configured to perform a GET on the token resource URL to get a JSON object representing the token.

An example JSON object for the resource may include:

```
{
    "token":    alpha-numeric
    "expiry-time":  date format
    "ip-type":  "text"
    "ip-address": "text"
    "key" : "alpha-numeric"
}
```

The ip-type value is either in IPv4 or IPv6. The ip-address value may include the MAG IP address to which the token is assigned. The key value is sent to MAG 103 through LMA/HAAA, which the MAG uses to encrypt the metadata before forwarding the requests to the cloud service 109.

The Token resource allows token details to be seen or to delete a token. An example URL for the Token resource is /api/{tenant-id}/tokenservice/{token-id}. The Token resource supports GET and DELETE methods or commands. The GET method on Token resource URL is used to retrieve the details associated with a token. The DELETE method is used to delete an existing token.

The Token Service resource is configured to provide for the creation and listing of the tokens. An example URL for the Token Service resource includes /api/{tenant-id}/tokenservice. The Token Service resource supports the GET and the POST methods or commands. The GET method on the Token Service resource URL may be used to list tokens that have been created. The POST method may be used to create a new token.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

Figure 5:
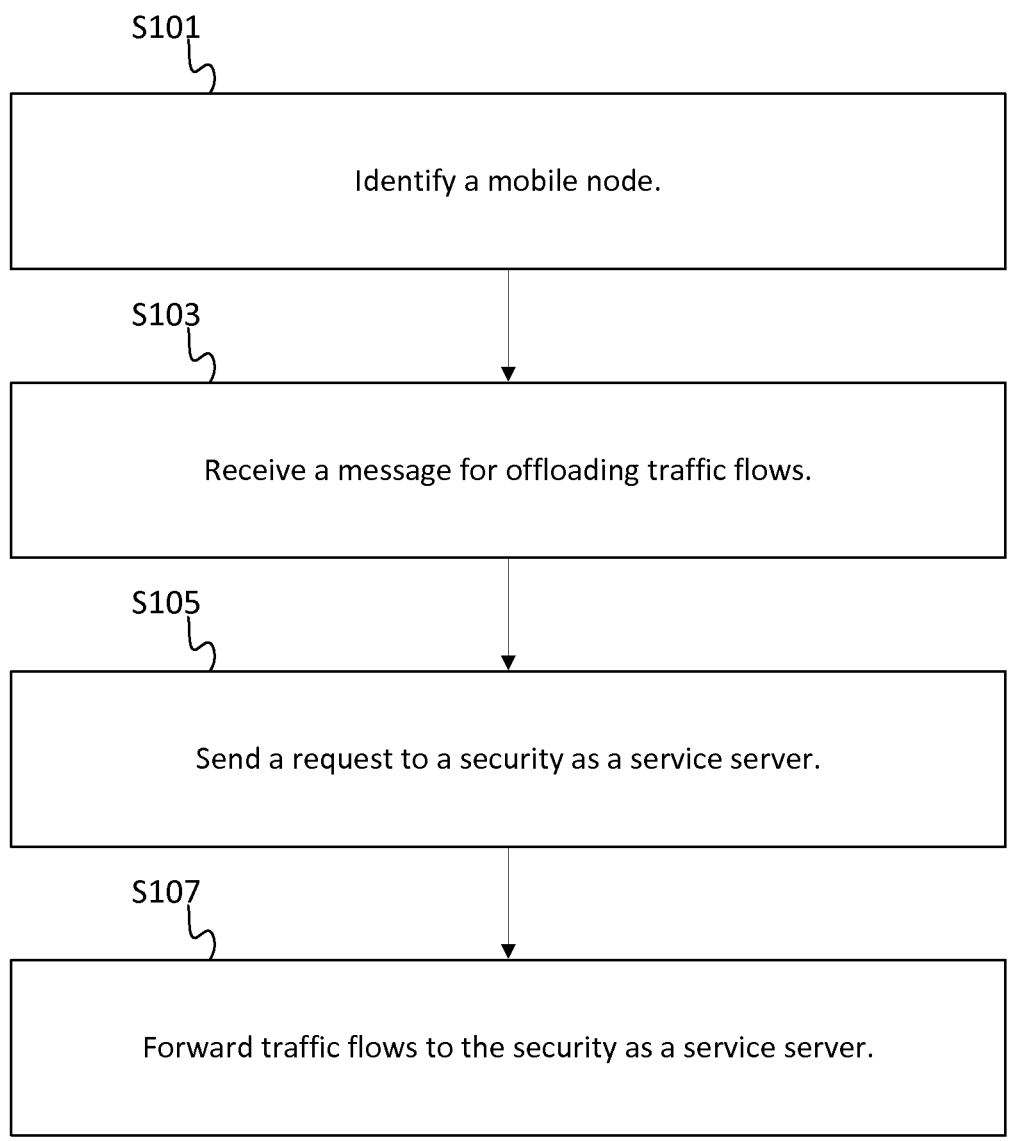
FIG. 5 illustrates an example flowchart for offloading security as a service.

FIG. 5 illustrates an example flowchart for offloading security as a service. The process of the flowchart may be performed by the MAG 103, LMA 105, or another network device. Additional, different, or fewer acts may be provided. At act S101, the mobile node is identified by the network device. The mobile node may be identified by either an IP address assigned by the home network or a care-of address provided by the MAG on behalf of the mobile node.

At act S103, a message proscribing the offloading of traffic flows is received at the network device. The identification message may specify a security policy for the IP flow. The security policy defines one or more security services to be performed on the IP flow. The security policy may include adult content filtering. The security policy may describe a protection level (low, medium, or high) that defines how restrictive to be in modifying the traffic flows when searching for malicious software.

A traffic redirector is expected to include the token in the metadata associated with traffic. This enables Scansafe to associate the redirected traffic with an authorized MAG. In addition NAI will also be part of the metadata. The metadata can be encrypted using a preshared key generated by the tower using HAAA/LMA as anchor. This preshared key will be securely delivered to the MAG.

At S105, the network device sends a request to the security as a service server. The request may be sent ahead of the traffic flow or with the traffic flows. The request defines policy enforcement. The request may include a Network Access Identifier (NAI), as defined by RFC 4282, published in 2005, which may include the PMIPv6 domain. The NAI is a stable identifier of the mobile node that the mobility entities in a PMIPv6 domain may use for predictably identifying the mobile node. The request may also include a traffic redirector identity, which identifies the network device. At S107, the network device forwards traffic flows to the security as a service server.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A method comprising:
identifying a mobile node, wherein the mobile node is configured for communication on a cellular network;
receiving an identification message including a security policy for the mobile node;
based on the identification message, generating a request that identifies the security policy, wherein the request includes a token that permits access to a security as a service server configured to enforce the security policy on a traffic flow in route to an internet;
sending the request to the security as a service server; and
forwarding the traffic flow directly from the mobile node to the security as a service server over another network different from the cellular network, wherein the security as a service server enforces the security policy for the traffic flow.

2. The method of claim 1, wherein the security policy in the identification message originates from a home authentication, authorization, and accounting server.

3. The method of claim 1, further comprising:
sending a proxy binding update to a local mobility anchor;
wherein receiving the identification message includes receiving, from the local mobility anchor, the identification message in response to the proxy binding update.

4. The method of claim 1, further comprising:
subscribing as an extensible messaging and presence protocol client to a local mobility anchor; and
wherein receiving the identification message includes receiving the identification message from the local mobility anchor.

5. The method of claim 1, wherein the security as a service server enforces the security policy for the traffic flow by detecting an indication of malicious software in the traffic flow, and/or by filtering content of the traffic flow according to a user profile.

6. The method of claim 1, wherein the identification message includes a network access identifier.

7. The method of claim 1, wherein the security policy for the mobile node corresponds to a service level agreement indicating one or more security services to apply to the traffic flow.

8. A network device comprising:
a communication interface configured to communicate with a mobile node and a security as a service server;
a memory; and
a controller coupled to the memory, wherein the controller is configured to:
identify the mobile node, wherein the mobile node is configured for communication on a cellular network;
receive an identification message including a security policy for the mobile node;
based on the identification message, generate a request that identifies the security policy, wherein the request includes a token that permits access to the security as a service server configured to enforce the security policy on a traffic flow in route to an internet;
send the request to the security as a service server; and
forward the traffic flow directly from the mobile node to the security as a service server over another network different from the cellular network, wherein the security as a service server enforces the security policy for the traffic flow.

9. The network device of claim 8, wherein the security policy in the identification message originates from a home authentication, authorization, and accounting server.

10. The network device of claim 8, wherein the controller is further configured to:
send a proxy binding update to a local mobility anchor;
wherein the controller is configured to receive the identification message by receiving, from the local mobility anchor, the identification message in response to the proxy binding update.

11. The network device of claim 8, wherein the controller is further configured to:
subscribe as an extensible messaging and presence protocol client to a local mobility anchor;
wherein the controller is configured to receive the identification message by receiving the identification message from the local mobility anchor.

12. The network device of claim 8, wherein the security as a service server enforces the security policy for the traffic flow by detecting an indication of malicious software in the traffic flow, and/or by filtering content of the traffic flow according to a user profile.

13. The network device of claim 8, wherein the security policy for the mobile node corresponds to a service level agreement indicating one or more security services to apply to the traffic flow.

14. The network device of claim 8, wherein the identification message includes a network access identifier.

15. One or more non-transitory computer readable storage media encoded with instructions that, when executed by a processor, are configured to:
identify a mobile node, wherein the mobile node is configured for communication on a cellular network;
receive an identification message including a security policy for the mobile node;
based on the identification message, generate a request that identifies the security policy, wherein the request includes a token that permits access to a security as a service server configured to enforce the security policy on a traffic flow in route to an internet;
send the request to the security as a service server; and
forward the traffic flow directly from the mobile node to the security as a service server over another network different from the cellular network, wherein the security a service server enforces the security policy for the traffic flow.

16. The non-transitory computer readable media of claim 15, wherein the instructions further cause the processor to:
send a proxy binding update to a local mobility anchor;
wherein the instructions that cause the processor to receive the identification message include instructions that cause the processor to receive, from the local mobility anchor, the identification message in response to the proxy binding update.

17. The non-transitory computer readable media of claim 15, wherein the instructions further cause the processor to:
subscribe as an extensible messaging and presence protocol client to a local mobility anchor; and
wherein the instructions that cause the processor to receive the identification message include instructions that cause the processor to receive the identification information from the local mobility anchor.

18. The non-transitory computer readable media of claim 15, wherein the security policy for the mobile node corresponds to a service level agreement indicates one or more security services to apply to the traffic flow.

19. The non-transitory computer readable media of claim 15, wherein the security policy in the identification message originates from a home authentication, authorization, and accounting server.

20. The non-transitory computer readable media of claim 15, wherein the security as a service server enforces the security policy for the traffic flow by detecting an indication of malicious software in the traffic flow, and/or by filtering content of the traffic flow according to a user profile.

* * * * *